Patented Dec. 1, 1931

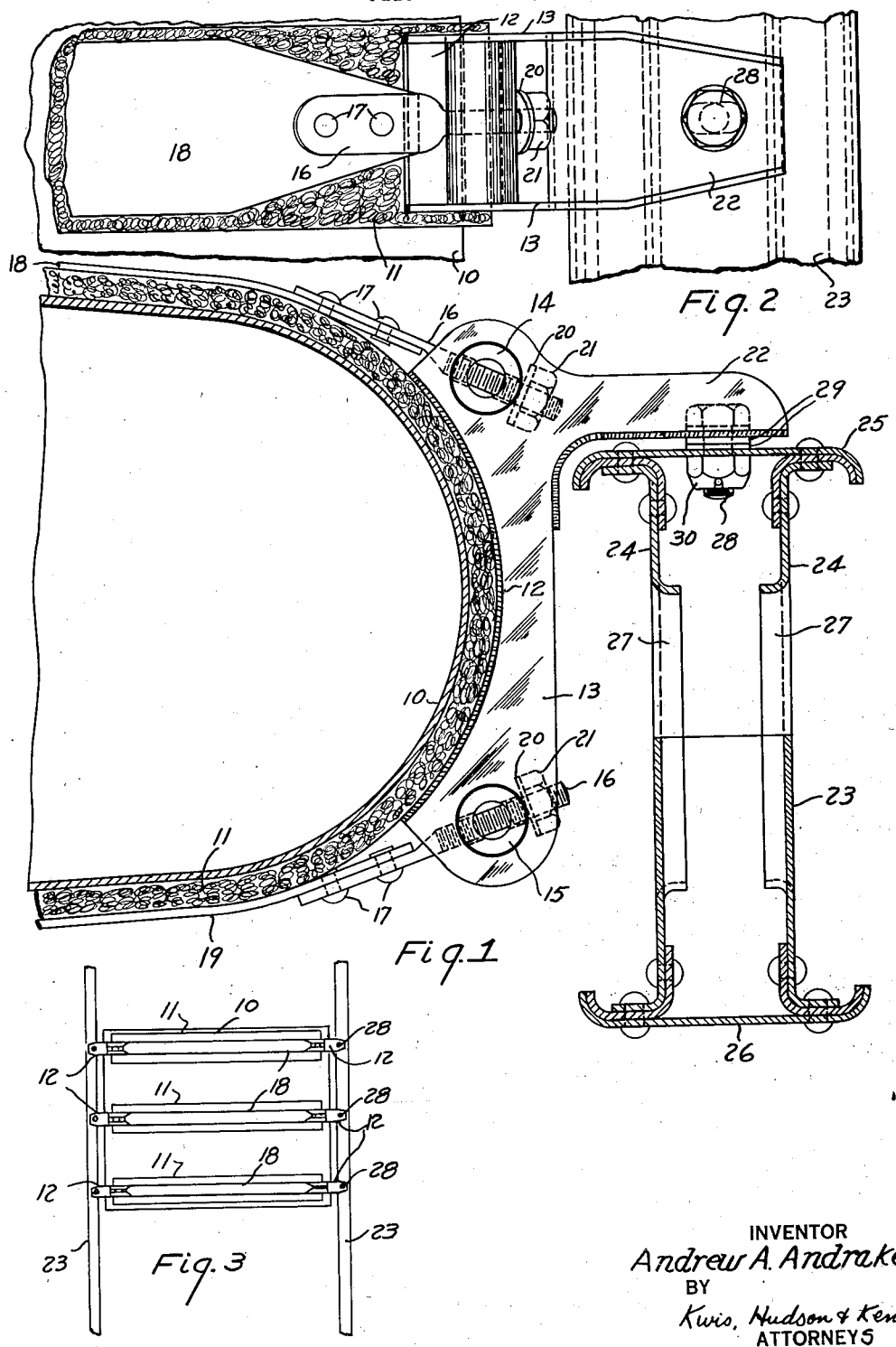

1,834,511

UNITED STATES PATENT OFFICE

ANDREW A. ANDRAKE, OF CLEVELAND, OHIO, ASSIGNOR TO THE GLENN L. MARTIN COMPANY, OF BALTIMORE, MARYLAND, A CORPORATION OF OHIO

TANK CARRIER

Application filed March 21, 1928. Serial No. 263,389.

This invention relates to improvements in tank supports, and while susceptible of fairly broad application it has special utility in connection with the mounting of fuel tanks in the wings of aircraft. It is more or less common practice, at the present time, to mount fuel tanks in the wings of aircraft by means of strap hangers, the necessary adjustments of the straps being made after the tank is in place in the wing, where, however, it is not readily accessible.

One of the objects of the present invention is the provision of a tank carrier of this character which may be assembled with the tank on the bench where the parts may be accurately adjusted under good working conditions.

Another object is the provision of a carrier which will permit the tank with its carrier attached to be lowered into the wing and securely fastened to the wing beams with a minimum of time and labor.

Another object is the provision of a tank carrier mechanism which will permit the units of the assembly to adjust themselves to each other and to the supporting elements in response to weaving of the structure in which it is mounted, or to inaccuracies of adjustments, and not strain the tank body or seams or chafe its surface.

Other objects and features of novelty will appear as I proceed with the description of that embodiment of the invention which, for the purposes of the present application, I have illustrated in the accompanying drawings, in which:

Fig. 1 is a view partially in elevation and partially in vertical section illustrating one end portion of my tank support in operative relation with a tank and a wing beam;

Fig. 2 is a plan view of the construction shown in Fig. 1; and

Fig. 3 is a plan view illustrating diagrammatically a complete tank in position between two wing beams.

In the drawings, a tank of the character used in the wings of aircraft is shown at 10. These tanks are necessarily constructed of light weight materials and on that account it is not feasible to attach fittings directly to the tank for the purpose of supporting the tank, as vibration would be apt to cause the fittings to loosen up and produce leaks. On this account, such tanks are usually supported in embracing straps which are attached to the wing beams or other supporting elements. In order to secure the proper gripping of the tank by the supporting straps, adjustments have to be made when the tank is in place and the making of such adjustments presents considerable difficulty because of the small amount of space between the tank and the supporting beams. As explained above, I overcome this difficulty by providing a unit assembly of the tank and carrier units, all adjustments being made while the tank is outside of the airplane.

Between the tank 10 and each of its supporting units I mount a relatively thick cushion strip of felt 11 which extends entirely around the tank and takes up within itself whatever relative movement may occur between the tank and the carrier units, thereby preventing chafing of the metal of the tank. Each carrier unit comprises a pair of relatively rigid brackets 12 which have inner concave surfaces shaped to conform to the shape of the felt cushions on the side walls of the tank. Each bracket 12 has a pair of spaced vertical sides 13 between which are journalled upper and lower trunnions 14 and 15 respectively. Each of these trunnions, near the middle thereof, is bored diametrically for the reception of the cylindrical threaded outer end of a strap terminal 16. The inner ends of the terminals 16 are flattened and are riveted, as shown at 17, to the ends of the sheet metal straps 18 and 19.

The latter extend all the way across the top and bottom surfaces, respectively, of the tank, and because of their flexibility readily accommodate themselves to the contour of the tank and felt cushion when the brackets 12 and straps 18, 19 are in position upon the tank. Washers and nuts 20 and 21 are placed upon the threaded ends of the terminals 16, and by this means the straps are tightened and the straps and brackets are drawn into firm engagement with the tank, that is through the intermediacy of the felt cushion strips 11.

Each of the brackets 12, near its upper end, has an outwardly extending arm 22 which preferably is formed, as shown, with a horizontal intermediate portion and vertical side portions. By means of these arms each supporting unit is adapted to be mounted upon the tops of a pair of wing beams, such as the beams 23 herein illustrated. These beams comprise two side members 24 and top and bottom members 25 and 26. The side members are provided at intervals with hand holes 27. The units of the tank support are preferably so spaced that the laterally extending arms 22 each stand above a pair of holes 27. The top member 25 of the beam is perforated to receive bolts 28, one for each arm 22, and these bolts extend through openings in the horizontal portions of the arms and through spacing washers 29 and are drawn up by nuts 30 bearing against the lower surface of the top member 25 of the beam. The holes 27 permit the ready manipulation of the nuts 30.

Thus when the straps 18, 19, felt cushions 11, and the brackets 12 have been assembled upon the tank and the nuts 21 drawn up to properly adjust the parts so that the tank is firmly gripped without being subjected to undue pressure, the complete assembly may be lowered into a wing from above, the bolts 28 put in place and the nuts 30 threaded thereupon, which completes the installation. The arrangement disclosed also permits the easy removal and replacement of tanks, should repairs become necessary.

It will be understood from the specification and drawings that the tank carrier assembly consists of a tank, felt cushion, or cushions, and a multiple number of tank carrier units, each unit consisting of two brackets hinge connected to two flexible straps, each strap being provided with means at one or both ends whereby its effective length may be varied.

While in the accompanying drawings and foregoing specification I have illustrated and set forth more or less in detail one particular embodiment of the invention, such disclosure is intended merely to be illustrative of the invention and should not be construed as a limitation upon the scope of the same.

Having thus described my invention, I claim:

1. In a tank carrier unit, a pair of rigid brackets, two flexible straps hinge connected to each of said brackets, and cellectively adapted to embrace a tank, and means upon said brackets for engagement with a supporting structure.

2. In a tank carrier unit, a pair of rigid brackets, flexible straps hinge connected to each of said brackets and collectively adapted to embrace a tank, means for adjusting the length of said straps, and means upon the brackets for engagement with a supporting structure.

3. In a tank carrier unit, a pair of rigid brackets, two flexible straps hinge connected to each of said brackets and collectively adapted to embrace a tank, means associated with said brackets and said straps to independently adjust the relative positions of said brackets to said tank, and means upon said brackets for engagement with a supporting structure.

4. In a tank carrier unit, a pair of rigid brackets, two flexible straps hinge connected to said brackets and adapted to embrace a tank, means associated with said straps and said brackets to adjust the position of either of said brackets to either of said straps, trunnions associated with said adjusting means, and means upon the brackets for engagement with a supporting structure.

5. In a tank carrier unit, a pair of rigid brackets, two flexible straps hinge connected to said brackets and adapted to embrace a tank, means associated with said straps and said brackets by which the relative lengths of said straps may be varied to change the position of said brackets in relation to each other and means upon said brackets for engagement with a supporting structure.

6. Means for mounting a tank comprising a multiple number of adjustable tank carrier units as specified in claim 4 embracing said tank; relatively thick resilient material in sheet form adapted to act as a cushion between the straps and brackets of said units and said tank; whereby said tank can be resiliently mounted upon and variably adjusted into alignment with a supporting structure.

7. Means for mounting a tank comprising a multiple number of adjustable carrier units as specified in claim 5 embracing said tank, relatively thick resilient material in sheet form interposed between said tank and the elements of said units and adapted to cushion said elements against the surface of said tank, whereby said tank can be resiliently mounted upon and variably adjusted into alignment with a supporting structure.

In testimony whereof, I hereunto affix my signature.

ANDREW A. ANDRAKE.